United States Patent
Flieder et al.

[15] 3,649,913
[45] Mar. 14, 1972

[54] CAPACITOR CHARGE INDICATOR CIRCUIT

[72] Inventors: Robert A. Flieder, Englewood Cliffs; Sumner S. Averett, Bayside, N.Y.

[73] Assignee: Berkey Photo, Inc., New York, N.Y.

[22] Filed: Mar. 19, 1969

[21] Appl. No.: 808,574

[52] U.S. Cl..................................324/133, 320/1, 324/111
[51] Int. Cl........................................................G01r 19/16
[58] Field of Search....................324/54, 133, 119, 123, 111, 324/29.5; 340/248, 249; 320/1

[56] References Cited

UNITED STATES PATENTS

| | | | |
|---|---|---|---|
| 2,455,543 | 12/1948 | Williams | 324/60 CD |
| 3,268,809 | 8/1966 | Meyer et al. | 324/60 C |
| 2,942,189 | 6/1960 | Shea et al. | 324/133 |
| 3,095,557 | 6/1963 | Bryan | 340/248 |
| 3,201,773 | 8/1965 | Magee | 340/248 |
| 3,249,762 | 5/1966 | Kintner | 340/248 UX |
| 3,281,675 | 10/1966 | Shillington | 324/54 |
| 3,287,636 | 11/1966 | Gagniere | 324/54 |
| 3,315,246 | 4/1967 | Huffman et al. | 340/248 |
| 3,321,754 | 5/1967 | Grimm et al. | 340/249 |
| 3,390,387 | 6/1968 | Hugenholtz | 340/248 |

Primary Examiner—Gerard R. Strecker
Attorney—Toren & McGeady

[57] ABSTRACT

A charge indicator circuit is shown as adapted to be incorporated in a circuit with a capacitor connected to a charging circuit. The charging circuit includes means to provide a source of direct current responsive to current flow to the main capacitor, this source of direct current being used to actuate switching means controlling an indicating light, the circuit being arranged so that the indicating light is ignited in the absence of current flow to the main capacitor.

14 Claims, 1 Drawing Figure

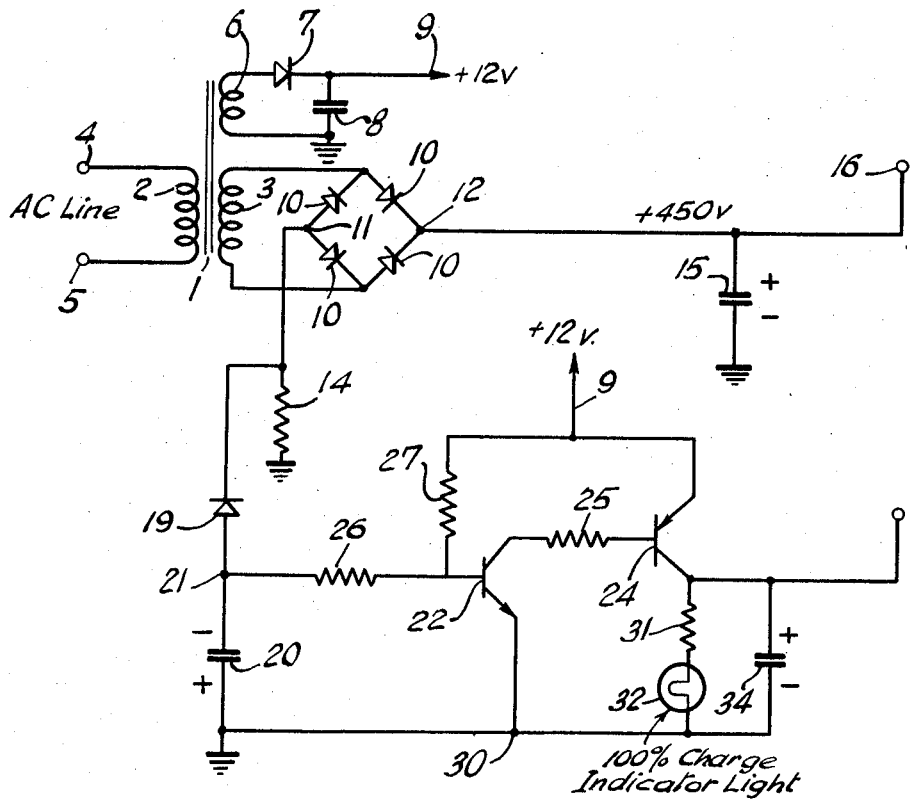

CAPACITOR CHARGE INDICATOR CIRCUIT

The present invention relates to discharge lamp circuits and more particularly to a charge indicator circuit for indicating a desired amount of charge on a capacitor bank powering a discharge lamp.

The discharge lamps may be used for exposing photographic film or other material sensitive to light. It is extremely important that the capacitor bank be charged to a desired level in order that the discharge through the lamp produce a desired amount of light so that the exposures of the light-sensitive material be uniform and reproducible.

Heretofore charge indicators for discharge lamp circuits have been provided but such circuits have been generally of the potential measuring type.

The present invention aims to provide an improved charge indicator circuit utilizing measurement of the charging current to provide an indication of the charge inasmuch as the charging current drops practically to zero as the capacitor is charged.

In accordance with the invention a charge indicator circuit is provided which includes means for measuring the charging current to the capacitor and indicating means controlled by the measuring means so as to provide a "charged" reading upon the cessation of the main charging current.

Other objects and advantages of the invention will be apparent from the following description and from the accompanying drawing which shows an embodiment of the invention.

The drawing is a schematic wiring diagram of a charge indicator circuit in accordance with the invention.

Referring to the drawing there is shown a transformer 1 having a primary 2 and a secondary 3. The primary 2 has a pair of terminals 4 and 5 adapted to be connected to a source of alternating current. A second secondary winding 6 is connected in series with a diode 7 to provide an output connected across a capacitor 8 having one terminal grounded and its other terminal providing a source 9 of direct current preferably of the magnitude of about 12 volts positive. The secondary winding 3 is connected across bridge connected diodes 10 to provide a source of direct current across terminals 11 and 12 of the bridge. Terminal 11 is connected to ground through a current sensing resistor 14, terminal 12 is connected to one terminal of a main storage capacitor 15 having its output as indicated by the terminal 16 providing a source of direct current, the potential of which may be about 450 volts.

The current sensing resistor 14 is incorporated into a circuit which senses the lack of a voltage drop there across. This circuit includes a diode 19 connected in series with a capacitor 20 to ground, connection 21 between the diode 19 and capacitor 20 providing a source of negative potential responsive to pulsating current flow through the current sensing resistor 14. A pair of transistors 22 and 24 are connected, as a direct connected amplifier, transistor 22 being of the NPN type, while transistor 24 is of the PNP type. The collector of transistor 22 is connected to the base of transistor 24 through a resistor 25. The base of transistor 22 is connected to the midpoint of a voltage divider including resistors 26 and 27. Resistor 26 is connected at 21 to the capacitor 20. Resistor 27 is connected to the positive 12-volt supply 9, the power supply being also connected to the emitter of the transistor 24. The emitter of transistor 22 is grounded as indicated at 30 while the collector of transistor 24 is connected to ground through a resistor 31 and indicating means which may be a lamp 32. A filter capacitor 34 is connected from the collector of transistor 24 to ground, the ungrounded terminal of the capacitor providing a source of positive potential and the lamp 32 providing a light signal when the transistor 24 is "on."

The operation of the charge-indicating circuit in accordance with the invention is based on the fact that at 100 percent charge on the main capacitor bank the current flow into the capacitor is negligible. Therefore the circuit may be quite simply described as a current flow indicator.

The secondary 3 through the rectifying diodes 10 provides a voltage of about 450 volts to ground. The second secondary 6 through the diode 7 provides a supply of 12 volts direct current. The potential sensed across the resistor 14 is passed through the diode 19 to the capacitor 20, the diode 19 being poled so that the capacitor 20 acquires a negative potential with respect to ground. The constants of the circuit are so arranged that both of the transistors 22 and 24 are saturated or turned "on" in the absence of a negative potential on the capacitor 20.

During the period of charge of the main capacitor 15 there is a pulsating voltage drop across the resistor 14 which is used to charge the capacitor 20 to the desired negative potential. At this time the negative charge on capacitor 20 overcomes the effect of the positive potential on the resistor 27 so as to cause the transistors 22 and 24 to be turned "off." In other words the junction of resistors 26 and 27 changes from a positive potential in the steady state or charged condition of the main capacitor 15 to a negative potential when charging current is flowing to the main capacitor 15. Therefore the transistors 22 and 24 go from an "on" condition in steady state or charged condition of the main capacitor 15 to an "off" condition while the charging current is flowing. Transistor 24 provides a switching action between the plus-12-volt supply 9 and ground for the lamp 32 and for a source of potential on the filter capacitor 34.

Upon the absence of the negative potential on the capacitor 20, after the main capacitor 15 has become charged, the bias on the transistors 22 and 24 is from the 12-volt power supply through resistor 27. Both transistors are switched "on" and therefore the indicator lamp 32 is turned "on" providing the 12-volt supply across the capacitor 34. This source of supply may be used for any desired purpose such as, for example, in connection with a fail-to-flash circuit described and claimed in our copending patent application Ser. No. 808,583 filed on even date herewith.

While the lamp 32 is preferably of the incandescent type in the circuit shown it might alternatively be a neon lamp or a buzzer or other means to provide an indication.

The following circuit components were used in an illustrative exemplification of the invention as set out in the FIGURE and are given by way of example:

| | |
|---|---|
| Diode 7 | 50 PIV diode |
| Diode 10 | 600 PIV diode |
| Diode 19 | 50 PIV diode |
| Transistor 22 | 2N5172 |
| Transistor 24 | 2N3638 |
| Capacitor 20 | 50 mf. |
| Capacitor 34 | 50 mf. |
| Resistor 14 | 5 ohms |
| Resistor 25 | 510 ohms |
| Resistor 26 | 1 kΩ |
| Resistor 27 | 4.3 kΩ |
| Resistor 31 | 30 ohms |

While the invention has been described and illustrated with respect to a specific embodiment thereof, it will be understood that other embodiments may be resorted to without departing from the invention. Therefore, the form of the invention set out above should be considered as illustrative and not as limiting the scope of the following claims.

We claim:

1. A charge indicator circuit for indicating a desired amount of charge on a capacitor connected to a charging circuit for the charging thereof, the charge indicator circuit comprising means responsive to current flow from said charging circuit to said capacitor below a predetermined amount, and indicating means controlled by said last-mentioned means thereby indicating the desired amount of charge on said capacitor by the reduction in charging current, said means responsive to current flow from said charging current to said capacitor including a storage capacitor, and switching means including a pair of transistors connected as a direct-coupled amplifier and arranged to provide a closed switching circuit in the absence of a potential on said capacitor.

2. A charge indicator circuit according to claim 1 in which said indicating means is a lamp.

3. A charge indicator circuit according to claim 2 in which a filter capacitor is connected across said lamp said filter capacitor charged while said lamp is ignited to provide a source of potential.

4. A charge indicator circuit for indicating a desired amount of charge on a main capacitor connected to a charging circuit for the charging thereof, the charge indicator circuit comprising a current-sensing resistor adapted to be connected in series with the main capacitor for measuring current flow thereto, a capacitor and a diode connected in series across said current-sensing resistor, a pair of transistors connected as a direct-coupled amplifier arranged to provide closed switching means in the absence of a potential on said capacitor, and indicating means controlled by said switching means whereby an indication of charge on said main capacitor is provided responsive to the lack of current flow to said main capacitor.

5. A charge indicator circuit according to claim 4 in which said indicating means is a lamp.

6. A charging circuit for a capacitor, comprising alternating current input means, rectifying means connected to said alternating current input means, circuit means for connecting said rectifying means to the capacitor so as to apply pulsed currents to the capacitor and store a voltage across the capacitor, charging current sensing means in said circuit means for establishing pulse indications of the pulsed currents, peak follower means connected to said sensing means for establishing a voltage corresponding to the peak of the current pulses as they vary, and indicating means responsive to said peak follower means for assuming one condition when the voltage established by said peak follower means exceeds one value and another condition below that value.

7. A charging circuit as in claim 6, wherein said peak follower means includes charging circuit means.

8. A charging circuit as in claim 7, wherein said charging circuit means includes a capacitor element for storing a voltage corresponding to the peak charging current and a diode for isolating said element after the voltage is stored.

9. A charging circuit as in claim 6, wherein said indicator means includes a lamp and switch means for holding said lamp on when said peak-forming means establishes a voltage less than a given value and for turning said lamp off when said peak-forming means establishes a voltage exceeding a given value.

10. A circuit as in claim 8, wherein said indicating means includes a lamp and switch means for holding said lamp on when said element stores a voltage less than a given value and for turning said lamp off when said element establishes a voltage exceeding a given value.

11. A circuit as in claim 6, wherein said rectifying means includes a rectifier bridge having an alternating side and a direct voltage side, said circuit means connecting said direct voltage side to the capacitor, said charging current sensing means being connected in said circuit means on the direct voltage side.

12. A charging circuit as in claim 10, wherein said rectifying means includes a rectifier bridge having an alternating side and a direct voltage side, said circuit means connecting said direct voltage side to the capacitor, said charging current sensing means being connected in said circuit means on the direct voltage side.

13. A circuit as in claim 11, wherein said circuit means includes a ground for connection to one side of the capacitor, said direct voltage side of said rectifier bridge includes a hot terminal for connection to the other side of the capacitor and a cold terminal, said sensing means being connected between said ground and said cold terminal.

14. A circuit as in claim 10, wherein said circuit means includes a ground for connection to one side of the capacitor, said direct voltage side of said rectifier bridge includes a hot terminal for connection to the other side of the capacitor and a cold terminal, said sensing means being connected between said ground and said cold terminal.

* * * * *